United States Patent Office 3,183,212
Patented May 11, 1965

3,183,212
PRODUCTION OF POLYOXYMETHYLENES
Heinrich Hopff and Hermann Metzler, Zurich, Switzerland, assignors to Deutsche Gold- und Silber-Scheideanstalt vormals Roessler, Frankfurt am Main, Germany
No Drawing. Filed July 27, 1961, Ser. No. 127,096
Claims priority, application Germany, July 30, 1960,
D 33,898
3 Claims. (Cl. 260—67)

The present invention relates to a process for the polymerization of monomeric water free formaldehyde or lower oligomers of formaldehyde, especially trioxane, with the aid of a new type of catalyst.

It is already known that formaldehyde and trioxane can be polymerized to polymeric formaldehyde with various catalysts. For example, monomeric formaldehyde has been polymerized in an inert solvent medium under exclusion of water in the presence of catalysts, such as, aliphatic or aromatic amines, or trialkyl derivatives of arsenic, antimony or phosphorus, sulfuric acid, boron trichloride and mercaptides of copper or aluminum have also been employed as catalysts. In addition, it has been proposed to employ compounds containing the structural element =N—CSS— or salts thereof or inorganic alkalies as catalysts. Furthermore, it has been proposed to employ finely divided fillers in catalytic quantities as catalysts. In addition, the polymerization of formaldehyde or trioxane with the aid of organic compounds of perchloric acid, such as, perchloric acid esters or mixed anhydrides of perchloric acid with organic acids, has also been suggested.

According to the invention it was found that water free formaldehyde or its lower polymers, such as trioxane, can easily be converted to eupolyoxymethylenes having molecular weights between 10,000 and 50,000 with a good yield when perhalic acids, such as perchloric acid and periodic acid or salts of such acids are employed as catalysts. Of the salts, those of the alkali metals are especially to be mentioned. The alkaline earth metal salts and some of the heavy metal salts of perhalic acids can be used equally as well and at times advantageously. Salts of perhalic acids with organic basic nitrogen compounds, especially primary, secondary and tertiary amines, have also proved advantageous.

The catalysts are employed in quantities of about 0.1% based upon the quantity of formaldehyde to be polymerized. This quantity represents about the optimum but within certain ranges quantities above and below can be employed. The polymerization according to the invention is carried out in the usual manner, either by polymerizing monomeric water free formaldehyde by introducing gaseous formaldehyde, if desired diluted with an inert gas, into an inert organic solvent containing the catalyst or, when a lower polymer of formaldehyde, such as trioxane, is employed, the polymerization can be carried out in the fused state without the aid of a solvent. The polymerization preferably is effected at temperatures between 50 and 150° C. as the polymerization proceeds very rapidly in this temperature range but lower or higher temperatures can also be employed.

The polymers produced soften at temperatures in the range of 160–180° C. and soluble on warming in selected solvents, such as, for example, dimethyl formamide, dimethyl foramide, dimethyl sulfoxide. On cooling, the polymethylenes precipitate out again. The process according to the invention can be varied by employing other known catalysts for the polymerization of formaldehyde or trioxane in addition to the catalysts according to the invention.

The catalysts according to the invention are suited both for the homopolymerization of formaldehyde and trioxane as well as the copolymerization thereof. The copolymerization of trioxane with various cyclic ethers which has already been proposed can be initiated with traces of perhalic acids or their salts. It is also possible to polymerize monomeric formaldehyde or trioxane in the presence of chain transfer agents with good success using the catalysts according to the invention.

An additional stabilization of the polyoxymethylenes produced according to the invention against thermal degradation or autoxidation by subsequent acylation or etherification using antioxidants is of advantage. For example, the terminal OH groups of the polyoxymethylene can be esterified with aliphatic or aromatic carboxylic acid anhydrides, such as acetic acid anhydride or benzoic acid anhydride and the like. In a similar manner etherification of the terminal OH groups can be accomplished by treatment with alkylating agents, such as methyl chloride, ethyl chloride in the presence of alkalies. An aftertreatment with ketenes instead of acetic acid anhydride leads to the same result.

The polyoxymethylenes obtained according to the invention can be used to produce shaped bodies employing procedures normally employed for thermoplastics, such as injecting molding, compression molding, rolling and the like or for coating objects. If desired, the process according to the invention can also be carried out in the presence of such other known substances which improve the processing and/or stability and/or mechanical properties of the shaped bodies. Examples of such substances, for instance, are statbilizers or plasticizers which do not influence the course of the polymerization.

In this way it is possible to obtain shaped bodies which are tough and elastic and some of which are even not degraded by alkalies and which are rather stable against acids. Upon heating to 180° C. for one hour they exhibit only very slight depolymerization.

Obviously fillers or pigments can be incorporated therein, such as, for example, glass fibers, mineral wool or advantageously highly dispersed finely divided active fillers such as alkaline carbon black, oxides of metals or metalloids, such as aluminum oxide, titanium dioxide, zirconium oxide or silicon dioxide, produced by conversion of volatile compounds of such metals in the vapors phase at high temperatures in a hydrolyzing or oxidizing medium.

The following examples will serve to illustrate the invention with reference to several embodiments thereof. In such examples the proportions are given in parts by weight unless otherwise specified.

Example 1

100 parts of trioxane were heated together with 0.1 part of periodic acid and slowly heated to 90° C. in a closed vessel. After ½ hour, 94 parts of a polymer with an average molecular weight of 21,000 was obtained which softened at 170° C. The polymer was heated with 10 times the quantity of acetic acid anhydride with the addition of 5 parts of sodium acetate at 100° C. A snow white powder was obtained which is stable at temperatures up to over 200° C.

Example 2

10 parts of trioxane were melted at 100° C. in a stirring vessel and 0.05 part of 50% perchloric acid introduced dropwise. The melt which originally was clear solidified almost immediatedly to a solid white cake. The yield of polymer was 9.7 parts. The polymer had a molecular weight of 15,000 and softened in the range of 170–180° C.

*Example 3*

Formaldehyde vapor produced by the hydrolysis of paraformaldehyde, after freezing out the last traces of water, was introduced with stirring into benzine having a boiling point range of 50–120° C. containing 0.01 to 1% of potassium periodate suspended therein. A portion of the polymer already precipitated out at room temperature but it was found advisable to heat the benzine to 50° C. in order to provide a considerable acceleration of the polymerization. The polymer produced had a molecular weight of 22,000 and softened in the range of 175–180° C. Analogous results were obtained by replacing the periodate by potassium perchlorate.

We claim:

1. A process for the production of polyoxymethylenes from a water free formaldehyde compound selected from the group consisting of monomeric formaldehyde and low polymers of formaldehyde which comprises polymerizing such formaldehyde compound in the absence of water in contact with 0.01 to 1% by weight with reference to the formaldehyde compound of a perhalic compound selected from the group consisting of, potassium perchlorate and potassium periodate perchloric acid, periodic acid as the sole polymerization catalyst.

2. The process of claim 1 in which said polymerization is carried out at temperatures between 50 and 150° C.

3. A process for the production of polyoxymethylenes from a water free formaldehyde compound selected from the group consisting of monomeric formaldehyde and low polymers of formaldehyde which comprises polymerizing such formaldehyde compound in a liquid phase in the absence of water in contact with about 0.1% by weight based on the formaldehyde compound of a perhalic compound selected from the group consisting of perchloric acid, periodic acid, potassium perchlorate and potassium periodate as the sole polymerization catalyst at a temperature between 50 and 150° C.

References Cited by the Examiner

UNITED STATES PATENTS 2,821,521  1/58  Price _____ 260—63
2,985,623  5/61  Schweitzer et al. _____ 260—67

OTHER REFERENCES

Head et al.: Chem. Soc. Journ. (1952), pt. 2, pp. 2046–2052.

Tompsett et al.: Analyst, vol. 78 (1953), pp. 209–216.

WILLIAM H. SHORT, *Primary Examiner.*

H.N. BURSTEIN, *Examiner.*